(12) United States Patent
Mitrovich

(10) Patent No.: US 11,046,574 B2
(45) Date of Patent: *Jun. 29, 2021

(54) LOCOMOTIVE FUELING ADAPTER

(71) Applicant: SpillX LLC, Seattle, WA (US)

(72) Inventor: Michael J. Mitrovich, Kenmore, WA (US)

(73) Assignee: SPILLX LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,829

(22) Filed: Oct. 2, 2019

(65) Prior Publication Data

US 2020/0031660 A1 Jan. 30, 2020

Related U.S. Application Data

(63) Continuation of application No. 15/730,014, filed on Oct. 11, 2017, now Pat. No. 10,442,677.

(60) Provisional application No. 62/463,947, filed on Feb. 27, 2017, provisional application No. 62/407,195, filed on Oct. 12, 2016.

(51) Int. Cl.
  *B67D 7/42* (2010.01)
  *B67D 7/32* (2010.01)
  *B67D 7/04* (2010.01)
  *F16L 55/10* (2006.01)

(52) U.S. Cl.
  CPC .............. *B67D 7/42* (2013.01); *B67D 7/04* (2013.01); *B67D 7/3218* (2013.01); *B67D 7/3245* (2013.01); *F16L 55/1015* (2013.01)

(58) Field of Classification Search
  CPC .......... B67D 7/42; B67D 7/04; B67D 7/3218; B67D 7/3245; B67D 2007/0421; F16L 55/1015
  See application file for complete search history.

(56) References Cited

U.S. PATENT DOCUMENTS

| | | | | |
|---|---|---|---|---|
| 3,190,322 A ‡ | 6/1965 | Brown | ................... | B64D 39/06 141/383 |
| 4,103,712 A ‡ | 8/1978 | Fletcher | ................ | F16L 37/107 137/614.06 |
| 4,441,533 A ‡ | 4/1984 | Snyder | ..................... | B67D 7/48 141/22 |
| 5,405,120 A ‡ | 4/1995 | Kerpan | ................. | F16L 37/252 141/207 |
| 5,595,217 A ‡ | 1/1997 | Gillen | ..................... | F16L 37/18 137/614.06 |
| 5,690,154 A ‡ | 11/1997 | Kremer | .................. | B60K 15/04 141/312 |

(Continued)

OTHER PUBLICATIONS

"Adapter, Pressure Fuel Servicing, Nominal 2.5-Inch Diameter", Military Standard—MS24484, Feb. 1983, 1 page.‡

(Continued)

*Primary Examiner* — Timothy L Maust
(74) *Attorney, Agent, or Firm* — Colby Nipper PLLC

(57) ABSTRACT

A fueling adapter configured to permit a fuel dispenser which terminates in a twist lock mating assembly to be used to supply fuel to a fuel tank which has a fuel receiver outfitted with a dry break connector connected thereto, said fueling adapter comprising a dry break assembly rotatably connected to a twist lock assembly via a rotational connector.

20 Claims, 15 Drawing Sheets

(56) References Cited

U.S. PATENT DOCUMENTS

| | | | | |
|---|---|---|---|---|
| 5,765,610 | A ‡ | 6/1998 | Brown ................... | B64D 37/16 137/614.06 |
| 5,904,302 | A ‡ | 5/1999 | Brown ..................... | B64F 1/28 137/614.06 |
| 6,234,224 | B1 ‡ | 5/2001 | Schultz, Jr. ............... | B64F 1/28 141/301 |
| 6,945,273 | B2 ‡ | 9/2005 | Reid ..................... | F16L 37/244 137/614.06 |
| 8,430,117 | B2 ‡ | 4/2013 | Mitrovich .............. | B67D 7/365 137/41 |
| 9,938,022 | B2 * | 4/2018 | Gammon ............... | B64D 37/00 |
| 10,442,677 | B2 * | 10/2019 | Mitrovich ................ | B67D 7/42 |
| 10,703,388 | B2 * | 7/2020 | Mitrovich ............ | F16L 37/252 |
| 2018/0099861 | A1 | 4/2018 | Mitrovich | |

OTHER PUBLICATIONS

"Notice of Allowance", U.S. Appl. No. 15/730,014, dated May 23, 2019, 8 pages.

\* cited by examiner
‡ imported from a related application

LOCOMOTIVE FUELING ADAPTER

CROSS REFERENCE TO RELATED APPLICATIONS

This application is a continuation application of application Ser. No. 15/730,014, filed Oct. 11, 2017, which claimed the benefit of U.S. Provisional Patent Application Ser. No. 62/407,195 filed Oct. 12, 2016, and U.S. Provisional Patent Application Ser. No. 62/463,947 filed Feb. 27, 2017, the disclosures of which are incorporated by reference herein in their entireties.

TECHNICAL FIELD

The disclosure generally relates to the field of quick-disconnect fueling apparatuses, and more particularly with fueling adapters used with such apparatuses.

BACKGROUND

There is a wide range of connection standards used today in the fueling industry, ranging from threaded connections using standards such as National Pipe Thread Taper (NPT), which is a U.S. standard for tapered threads used on threaded pipes and fittings to prevent leaks, to quick connect fittings such as cam locks and dry break interface standards. Such connection standards can be used with both fueling nozzle as well as with fueling receivers, with a fueling nozzle of one connection standard configured for use with a mating fueling receiver of the same connection standard. Often times it is necessary to use a fueling nozzle of one connection standard with a fueling receiver of another receiver. Utilizing such different connection standards together typically fails to result in a proper seal, and can result in leaks.

A first connection standard can be found in U.S. Pat. No. 4,441,533 which describes an automatic fuel dispenser for the fueling of locomotive fuel tanks utilizing a "twist lock coupling" connection.

A second connection standard utilizes a dry break connection of the type used for under wing fueling of aircraft. This connection standard is based on aviation military specification standard connection (MS 24484), and is referred to herein as the "dry break coupling" connection. A dry break coupling connection is present in the receiver generally illustrated in FIGS. 1 through 9 of U.S. Pat. No. 8,430,117.

The dry break coupling of U.S. Pat. No. 8,430,117 is a different connection system than the twist lock coupling connection specified in U.S. Pat. No. 4,441,533. In order to form a leak proof connection between a nozzle utilizing the twist lock coupling connection and a receiver utilizing the dry break coupling connection, an adapter is required which contains both connection standards.

SUMMARY OF THE DISCLOSURE

Several exemplary fueling adapters are described herein.

A first exemplary fueling adapter is configured for permitting a vehicle having a dry break coupling fuel receiver to be fueled from a fuel source having a twist lock coupling fuel dispenser.

The first exemplary fueling adapter comprises a fueling adapter configured to permit a fuel dispenser which terminates in a twist lock mating assembly to be used to supply fuel to a fuel tank which has a fuel receiver outfitted with a dry break connector connected thereto. The fueling adapter comprises a dry break assembly rotatably connected to a twist lock assembly via a rotational connector. The dry break assembly comprises a first passageway defined therethrough, and the twist lock assembly defines a second passageway therethrough. The first passageway is fluidly connected to the second passageway so as to define a fuel passageway through the fueling adapter. The dry break assembly is configured for connecting with the dry break connector. The dry break assembly comprises a tubular body portion which comprises an inside surface. The inside surface comprises an annular inner race groove. The twist lock assembly is configured for connecting with the twist lock mating assembly. The twist lock assembly comprises a twist lock coupling and a plug portion. The plug portion further comprises an extension which extends away from a first end of the plug portion. The extension comprises an outer surface into which an annular outer race groove is defined. The plug portion is configured for receiving the body portion thereon with the inner race groove aligned with the outer race groove. The rotational connector comprises the inner race groove and the outer race groove aligned to form a combined groove and a plurality of ball bearings received in the combined groove. The combined groove and ball bearings rotatably connecting the twist lock assembly to the dry break assembly.

Additional understanding of the devices and methods contemplated and/or claimed by the inventor can be gained by reviewing the detailed description of exemplary devices and methods, presented below, and the referenced drawings.

DEFINITIONS

Figure 1:
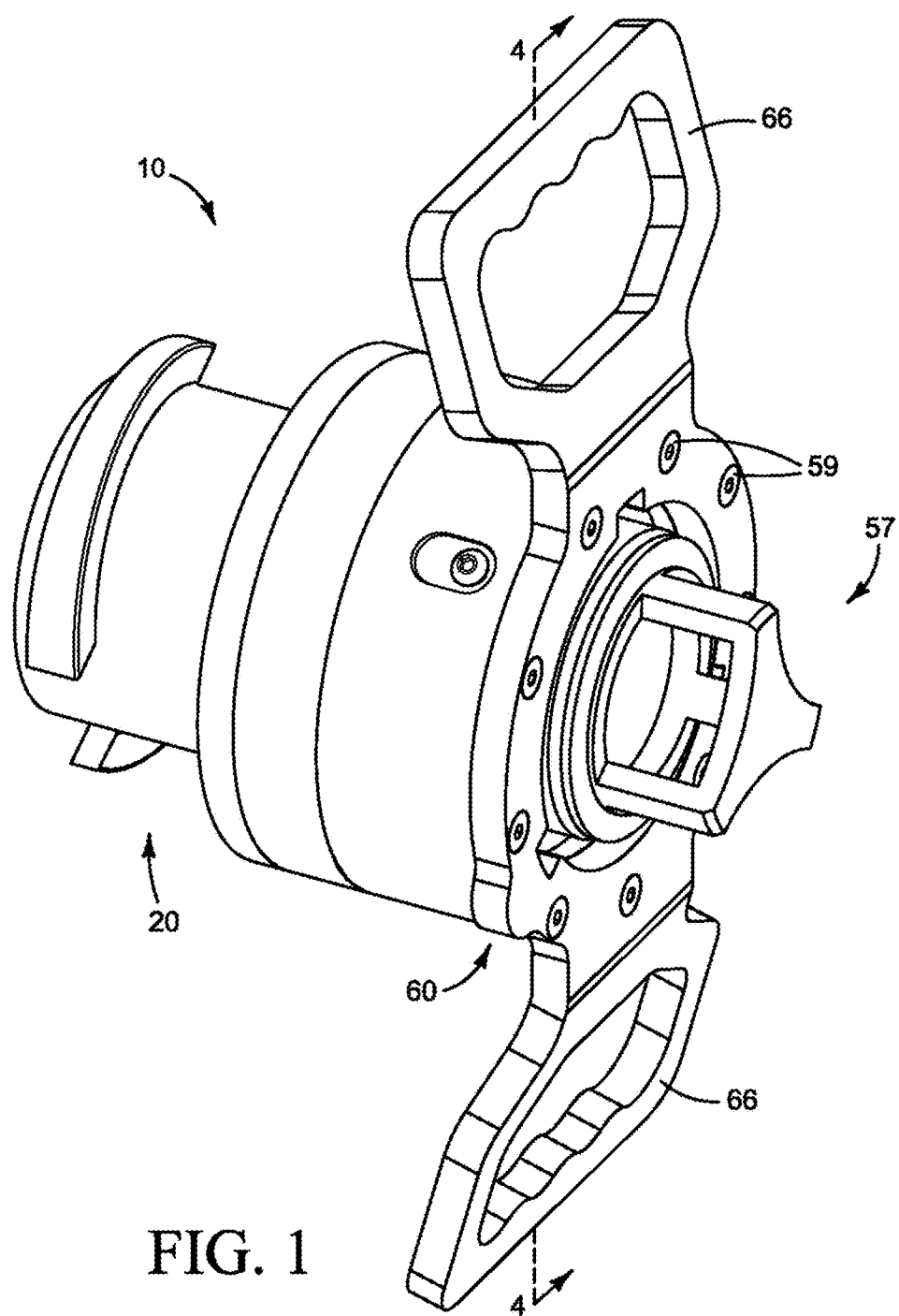
FIG. 1 is a second end perspective view of a first exemplary fueling adapter.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a handle" includes two or more such handles, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "locomotive" and grammatically related terms means "a rail transport vehicle," unless the context clearly dictates otherwise.

The use of "vehicle" means "an object used for transporting people or goods," unless the context clearly dictates otherwise. A locomotive is a type of vehicle.

The use of "API Style coupler" and grammatically related terms means "a bottom loading and vapor recovery connector," for instance of the type defined in the standard API Recommended Practice 1004, unless the context clearly dictates otherwise.

The use of "dry break", "MS 24484" and grammatically related terms means "a military-aviation dry break connection, possessing specification standard MS 24484" unless the context clearly dictates otherwise.

The use of "twist lock" and grammatically related terms means "capable of attachment via a twist lock connection," unless the context clearly dictates otherwise. An example of a twist lock connection is the first component having a pair of opposing L-shaped connectors and the second component comprising a pair of opposing elongated wedge shaped tabs illustrated in U.S. Pat. No. 4,441,533.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The inventive concept(s) relate to fueling adapters configured for permitting a locomotive having a dry break coupling style fuel receiver installed thereon to be fueled from a fuel source having a twist lock coupling fuel dispenser (e.g., U.S. Pat. No. 4,441,533). The inventive concept(s) is useful to aid in the interchangeability among different railroads and the connection standards they typically utilize. If a locomotive was equipped with a dry break style fuel dispenser connection and a nozzle with that style connection fitting was not present (but a twist lock coupling fuel dispenser was present instead), then the fueling adapter would enable the locomotive to be fueled with an alternative type of nozzle.

A first embodiment of the inventive concept(s) is illustrated in the Figures. Also illustrated in the Figures is a prior art fuel dispenser 80 and a prior art fuel receiver 90.

FIGS. 5 and 10-13 illustrate the prior art fuel dispenser 80. The twist lock mating assembly 81 of the fuel dispenser 80 is rotationally connected with a handle system 84, which in turn is connected with a fueling hose (not illustrated) connected to a fuel source (not illustrated) such as a fuel truck. The handle system 84 is configured for being turned and locked onto a mating fuel receiver (not illustrated), namely, the nozzle 85 of the fuel dispenser 80 is configured to be inserted into the mating fuel receiver. The twist lock mating assembly 81 comprises an annular sidewall that extends from the internal face 102. The sidewall defines a pair of diametrically opposed flanges 82 which are configured for mating engagement with a pair of tabs (not illustrated) located on the mating fuel receiver. The fuel dispenser 80 defines a fuel flow passageway 86 therethrough which would be fluidly connected to the fuel source so that fuel could flow from the fuel source, through the fueling hose, through the fuel flow passageway 86, out one or more outlets 87 and into the mating fuel receiver.

FIGS. 5-13 and 15-17 illustrate the prior art fuel receiver 90. An exemplary prior art fuel receiver is described in detail in U.S. Pat. No. 8,955,561. In the prior art fuel receiver 90 illustrated in the drawings, the fuel receiver 90 comprises a threaded portion 93 configured for receipt into a like threaded fuel port (not illustrated) defined within an exterior wall of a fuel tank (not illustrated).

The fuel receiver 90 defines a fuel flow passageway 94 therethrough, thereby permitting fuel to flow from a connected fuel dispenser and into the fuel tank. The fuel receiver 90 has a piston 99 which, upon fuel flow being supplied to the fuel receiver 90, moves to permit fuel to flow therethrough, as described in U.S. Pat. No. 8,955,561. The fuel receiver 90 terminates in a rim 95 which defines a fuel flow passageway 94. The rim 95 spaced from the body 97 of the fuel receiver 90. The dry break connector 92 comprises three tabs 96 about equiradially disposed, and which project outwards from the rim 95. The tabs 96 being generally wedge-shaped in side elevation. The tabs 96 spaced apart from the body 97 and a channel 98 is defined therebetween.

FIGS. 1 through 17 illustrate a first exemplary fueling adapter 10 configured to permit a fuel dispenser 80 which terminates in a twist lock mating assembly 81 to be used to supply fuel to a fuel tank (not illustrated) which has a fuel receiver 90 outfitted with a dry break connector 92 connected thereto. The first exemplary fueling adapter 10 comprises a dry break assembly 57 and a twist lock assembly 20, as illustrated in FIG. 1, a second end perspective view of a first exemplary fueling adapter.

Figure 7:
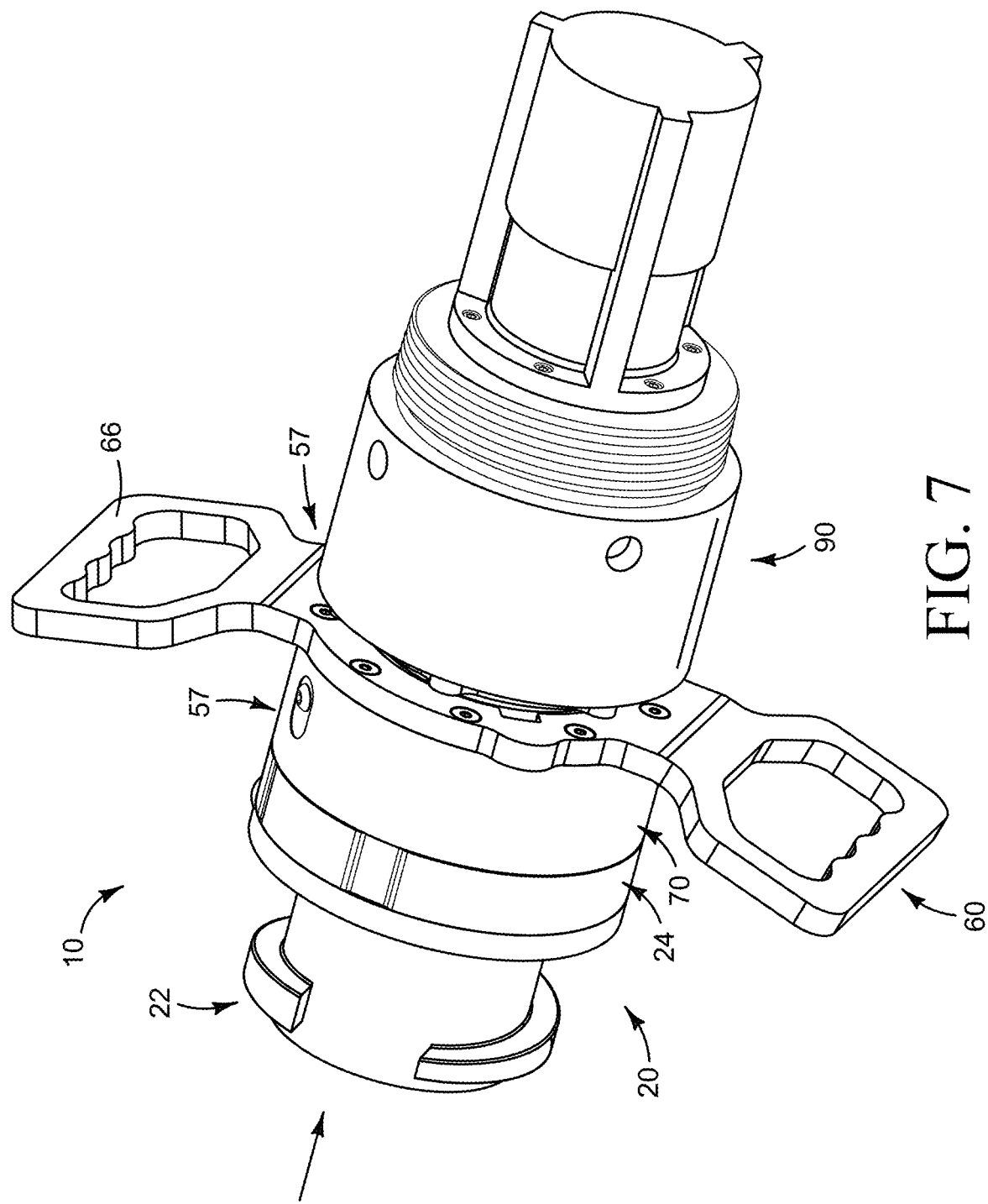
FIG. 7 is a perspective view of the second end of the exemplary fueling adapter of FIG. 1, illustrating the fueling adapter inserted into the receiver.
Figure 8:
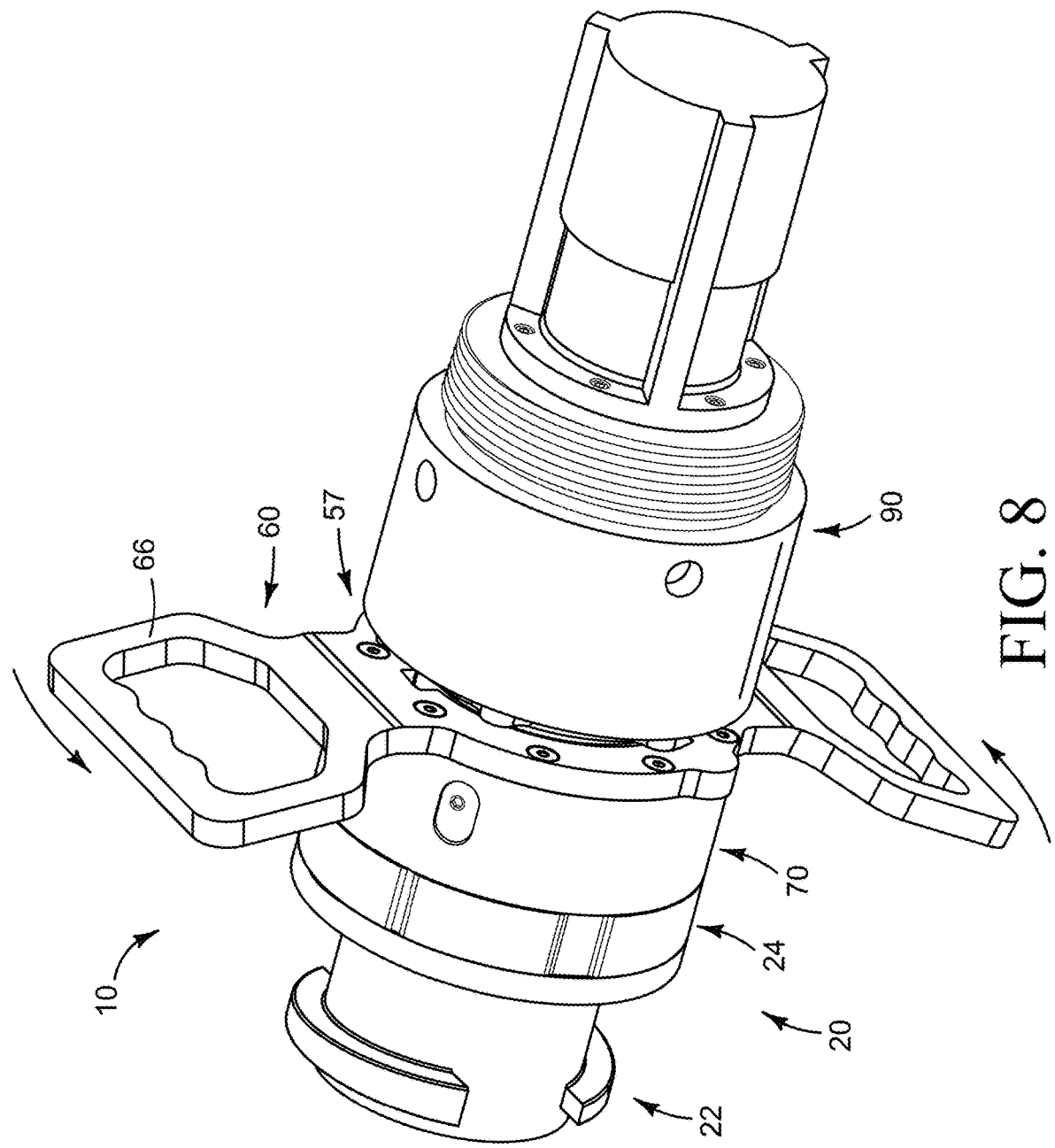
FIG. 8 is a perspective view of the second end of the exemplary fueling adapter of FIG. 1, illustrating the fueling adapter inserted into the receiver, and rotated onto the receiver.

Together, the dry break assembly 57 and twist lock assembly 20 are a body portion that defines a fuel passageway therethrough, namely the combination of the passageway 35 of the dry break assembly 57, and the passageway 46 of the twist lock assembly 20. The twist lock assembly 20 and the dry break assembly 57 rotatably connected together (as illustrated in FIGS. 7 and 8) through use of a rotational connector, such as a plurality of bearings 36.

Figure 2:
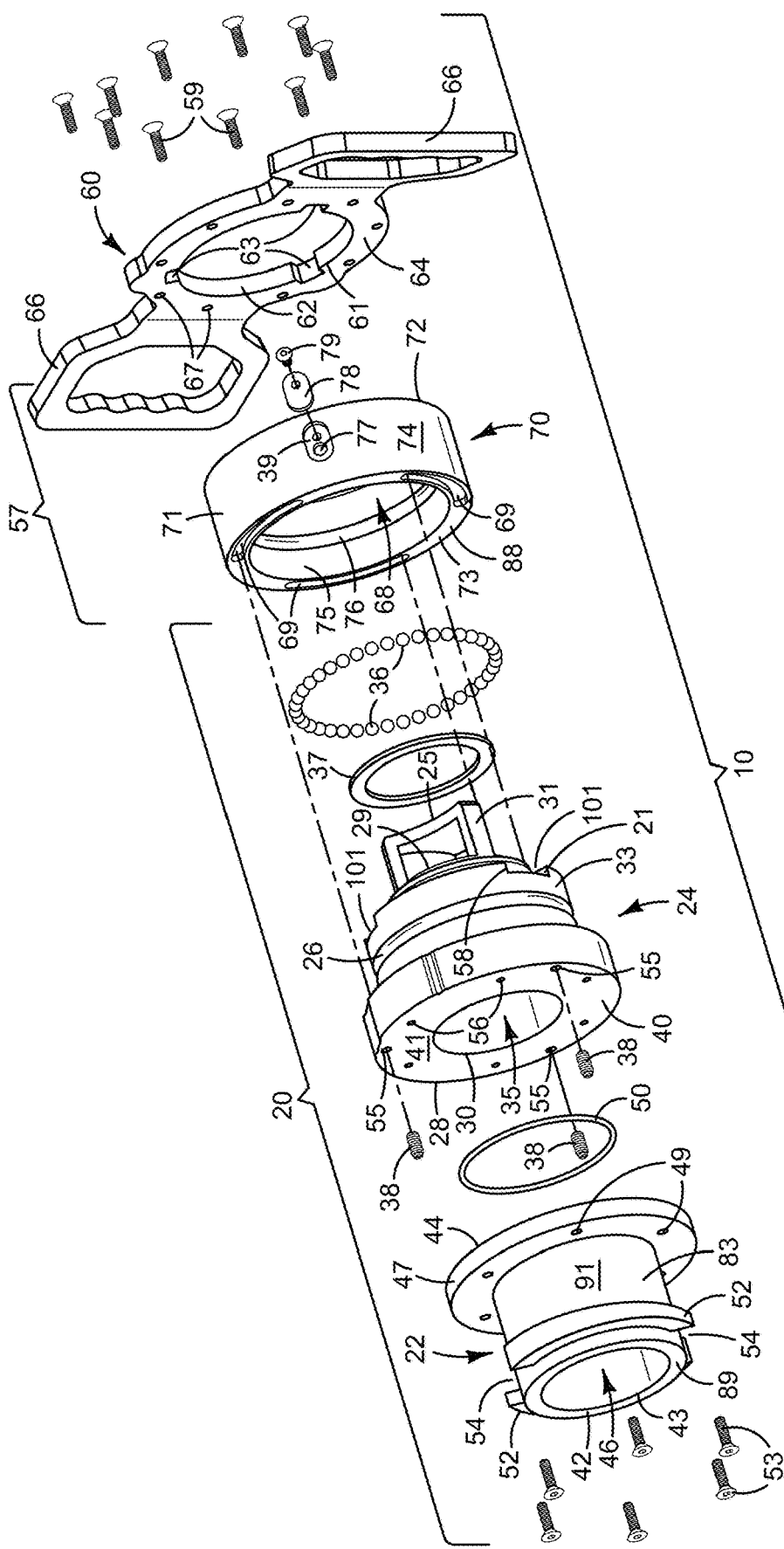
FIG. 2 is a first side, exploded view of the exemplary fueling adapter of FIG. 1.
Figure 3:
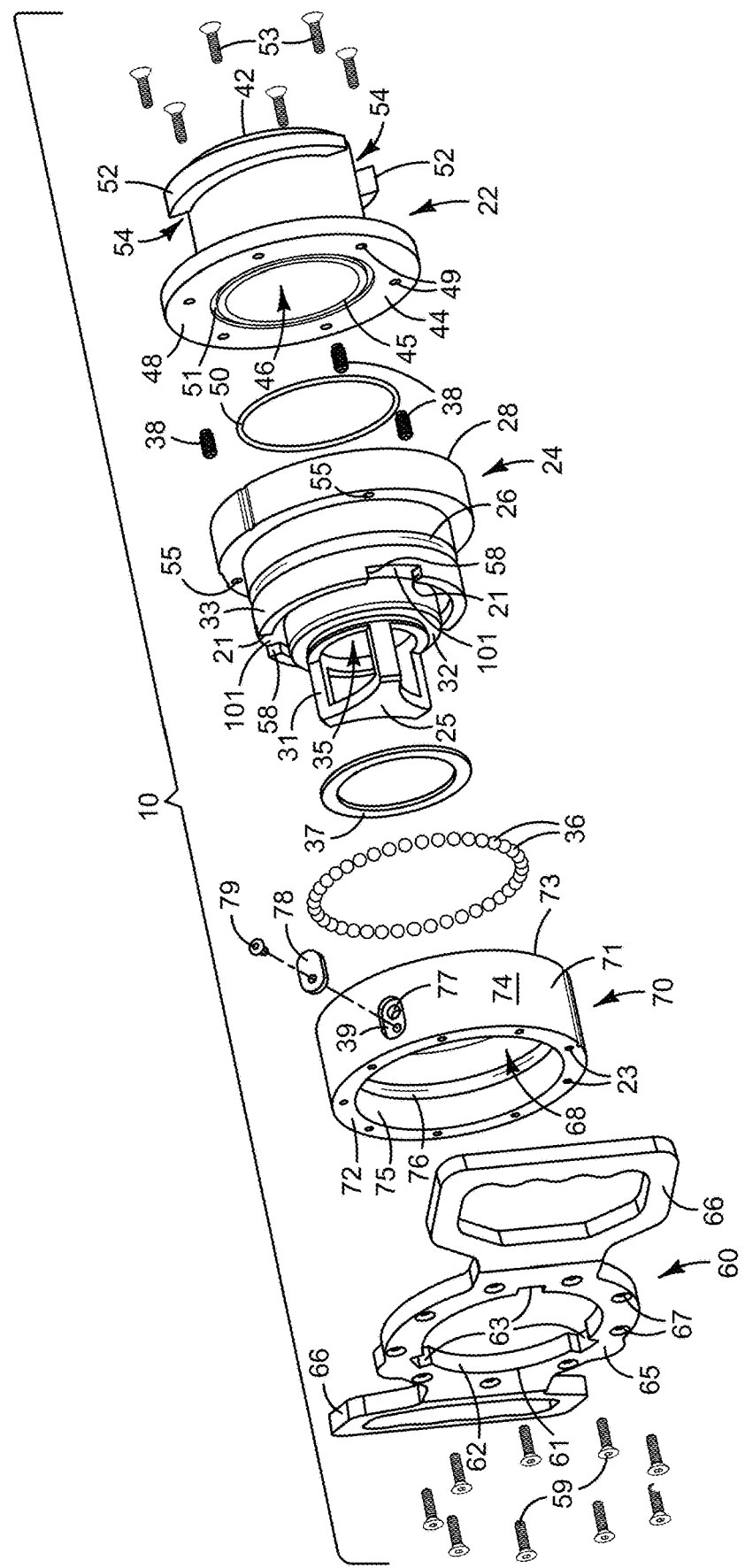
FIG. 3 is a second side, exploded view of the exemplary fueling adapter of FIG. 1.
Figure 4:
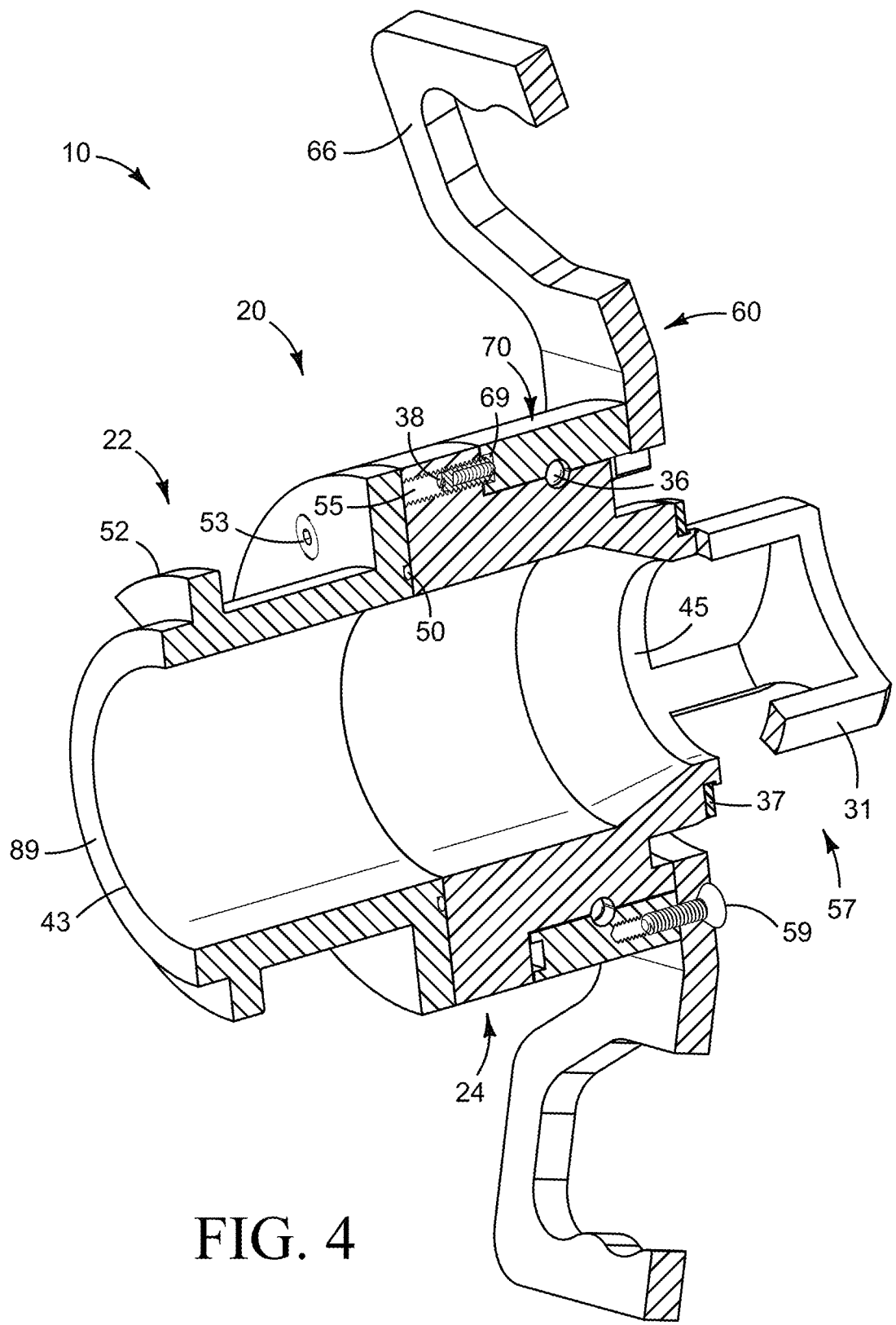
FIG. 4 is a section view, of the exemplary fueling adapter of FIG. 1.
Figure 5:
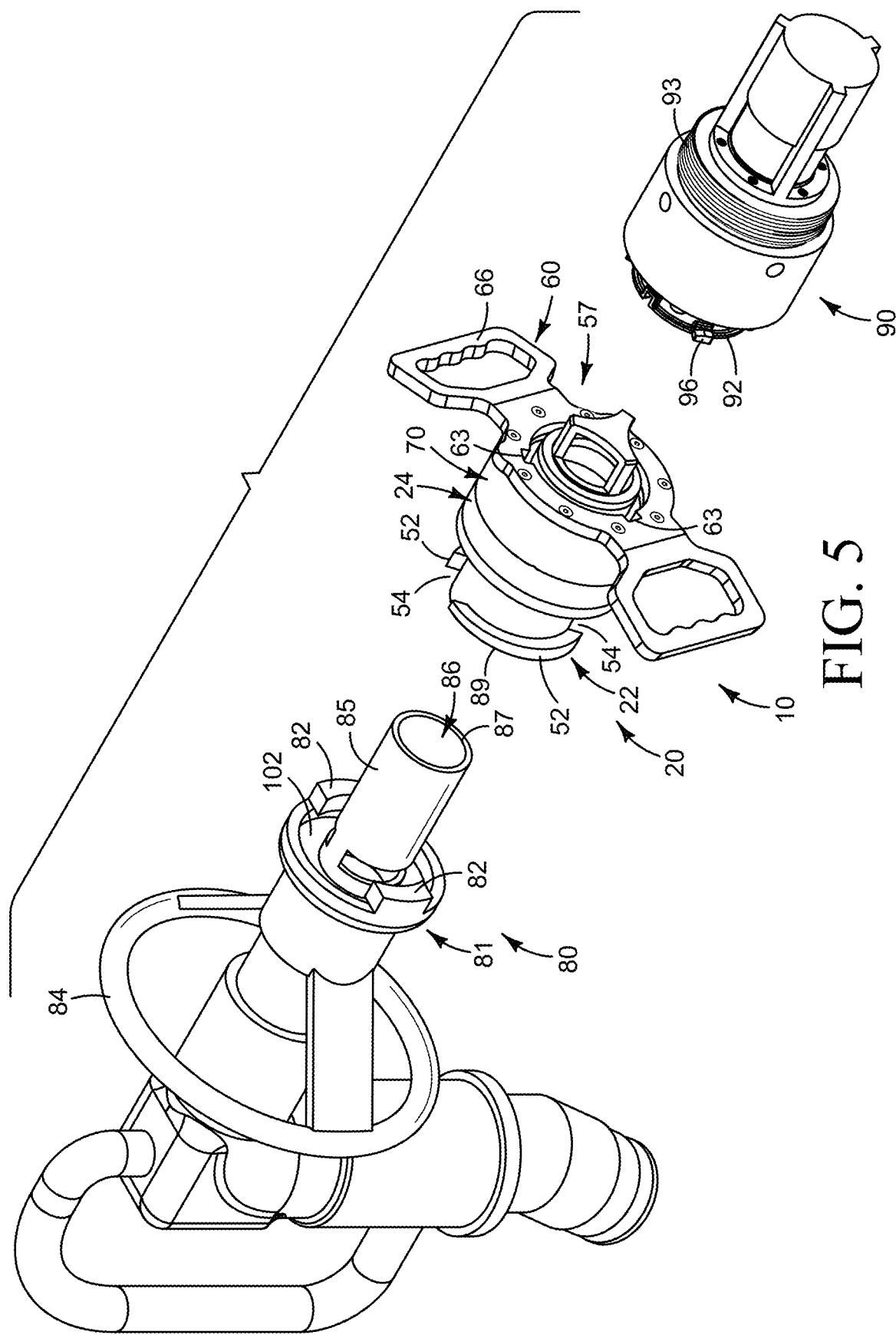
FIG. 5 is a perspective view of the second end of the exemplary fueling adapter of FIG. 1, including environment, unassembled.

FIG. 2 illustrates a first side, exploded view of the exemplary fueling adapter 10. FIG. 3 illustrates a second side, exploded view of the exemplary fueling adapter 10. FIG. 4 illustrates a section view of the exemplary fueling adapter 10. FIG. 5 illustrates a perspective view of the second end of the exemplary fueling adapter 10, along with the fuel dispenser 80 and fuel receiver 90, unassembled.

The dry break assembly 57 comprises a handle assembly 60 and a shell 70. In the first exemplary fueling adapter 10, the handle assembly 60 connects to the first end 72 of the shell 70 via a plurality of fasteners 54, such as machine screws, which are configured for receipt into threaded holes 23. A skilled artisan will be able to select an appropriate structure and material for manner the handle assembly 60 and shell 70 connect with one another and/or are formed in a particular embodiment based on various considerations, including the intended use of the fueling adapter, the intended arena within which the fueling adapter will be used, and the equipment and/or accessories with which the fueling adapter is intended to be used, among other considerations.

The handle assembly 60 defines a generally circular orifice 61 therethrough which has an annular sidewall 62 connected to the periphery thereof. The sidewall 62 defines three radially spaced slot 63 dimensioned and positioned to slidably receive the tabs 96 of the dry break connector 92 therethrough. The handle assembly 60 has an inside face 64 which faces the shell 70, and an outside face 65 which faces outwards. The handle assembly 60 further comprises at least one grip portion 66 which enables a user to grasp, handle and operate the dry break assembly 57.

The shell 70 comprises a generally circular, tubular body portion 71. The tubular body portion 71 has a first end 72 and a second end 73. The first end 72 is configured to connect with the handle assembly 60, preferably via a number of fasteners 54 configured to pass through holes 67 which are defined in the handle assembly 60, and into mating holes 59 defined in the first end 72 of the shell 70. While the Figures illustrate such a manner of connecting the handle assembly 60 to the shell 70, a skilled artisan will be able to select an appropriate structure for the connecting the handle assembly and the shell together in a particular embodiment based on various considerations, including the intended use of the fueling adapter, the intended arena within which the fueling adapter will be used, and the equipment and/or accessories with which the fueling adapter is intended to be used, among other considerations.

The second end 73 comprises an end face 88 which has a plurality of equiradially disposed limiter channels 69 defined therein. In the exemplary fueling adapter 10 illustrated in these Figures, the limiter channels 69 number three. The limiter channels 69 extend into the end face 88. The limiter channels 69 are configured to receive a plurality of limiter pins 38. The limiter channels 69 and limiter pins 38 are configured to limit the rotation of the twist lock assembly 20 in relation to the dry break assembly 57.

The tubular body portion 71 further comprises an outside surface 74 and an inside surface 75. The inside surface 75, first end 72 and second end 73 define a shell passageway 68 therethrough. The shell passageway 68 configured to receive the first end 25 of the plug portion 24 therethrough.

Figure 13:
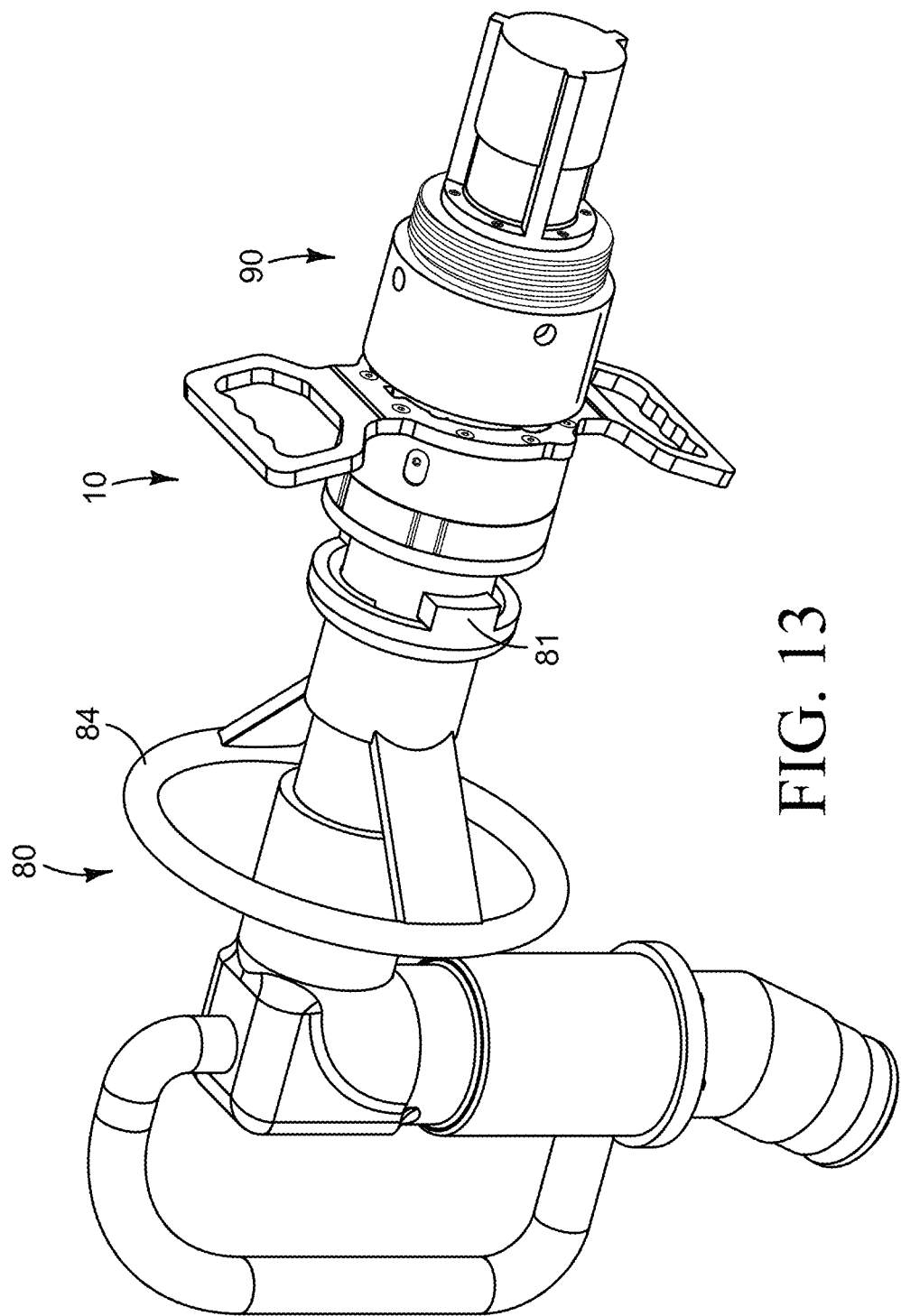
FIG. 13 is a rotated second end perspective view of the exemplary fueling adapter of FIG. 1, including environment, illustrating the fueling adapter locked onto the receiver, with the twist lock coupling fueling nozzle inserted into the fueling adapter, and with the fueling nozzle rotated onto the fueling adapter.
Figure 14:
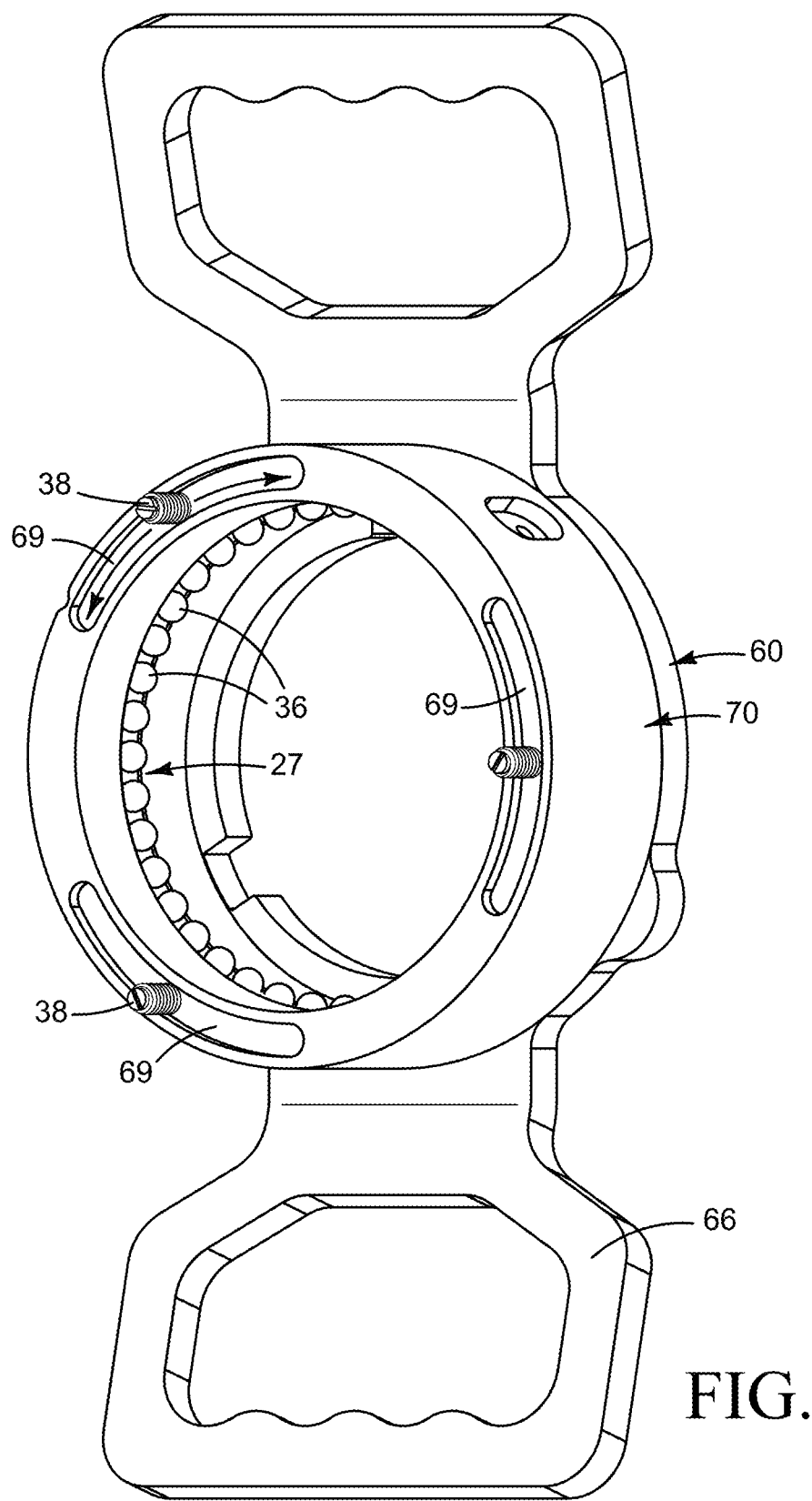
FIG. 14 is a perspective detail view of the exemplary fueling adapter of FIG. 1 illustrating the swivel limits, the twist lock coupling portion and body portion not illustrated.

An inner race groove 76 is defined in the inside surface 75, the inner race groove 76 generally matches an outer race groove 26 on the plug portion 24 of the twist lock assembly 20. When the inner race groove 76 and the outer race groove 26 are aligned, a combined groove 27 is defined which is configured to receive a plurality of ball bearings 36, as illustrated in FIG. 14. The ball bearings 36 connect the dry break assembly 57 to the twist lock assembly 20. The inner race groove 76, the outer race groove 26, and the ball bearings 36 together form the rotational connector in the fueling adapter illustrated in these drawings. While such grooves and bearings form the rotational connector in the fueling adapter illustrated in FIGS. 1 through 17, a skilled artisan will be able to select an appropriate structure and material for a rotational connector in a particular embodiment based on various considerations, including the intended use of the fueling adapter, the intended arena within which the fueling adapter will be used, and the equipment and/or accessories with which the fueling adapter is intended to be used, among other considerations.

While in the fueling adapter 10 illustrated in these drawings, the plug portion 24 and the dry break assembly 57 connect via ball bearings 36, a skilled artisan will be able to select an appropriate structure and material for the manner of connecting the body portion and the dry break assembly together in a particular embodiment based on various considerations, including the intended use of the fueling adapter, the intended arena within which the fueling adapter will be used, and the equipment and/or accessories with which the fueling adapter is intended to be used, among other considerations.

The outside surface 74 comprises a ball bearing insertion passageway 77 that extends inwards from the outside surface 74 to the inside surface 75. The inner race groove 76 is radially aligned with the ball bearing insertion passageway 77 so that ball bearings 36 may be inserted into the combined groove 27 when the inner race groove 76 and the outer race groove 26 are aligned. A groove cover 78 configured to cover the outside surface 74 opening into the ball insertion passageway 77 and retain the ball bearings 36 in the combined groove 27 after insertion. The groove cover 78 preferably attached to the shell 70 via a fastener 79. Preferably, the area of the shell 70 adjacent the ball bearing insertion passageway 77 is recessed, and defines a recess 39. The groove cover 78 is configured for receipt into the recess 39.

The twist lock assembly 20 comprises the twist lock coupling 22 and the plug portion 24. In the exemplary fueling adapter 10 illustrated in the Figures, the twist lock coupling 22 and plug portion 24 comprise separate components that connect together via a plurality of fasteners 53 configured to extend through orifices 49 defined in second end 44 of the twist lock coupling 22 and into matching threaded holes 55 defined in the second end 28 of the plug portion 24. In other exemplary twist lock assemblies, the twist lock coupling and the body portion can comprise a unitary piece. A skilled artisan will be able to select an appropriate structure for the twist lock assembly in a particular embodiment based on various considerations, including the intended use of the fueling adapter, the intended arena within which the fueling adapter will be used, and the equipment and/or accessories with which the fueling adapter is intended to be used, among other considerations.

The plug portion 24 comprises a first end 25 which defines an outlet 29, and a second end 28 which defines an inlet 30. The outlet 29 and inlet 30 define a passageway 35 therebetween through the plug portion 24.

The first end 25 further defines a poppet valve depressor 31 configured to depress the dry break connection poppet valve (not illustrated) of the fuel receiver 90 when the fueling adapter 10 is attached to the fuel receiver 90. The poppet valve depressor 31 illustrated has flat bottom with holes in the sides which allows the fuel to flow from the fueling adapter, into an attached receiver, and into the fuel tank.

The first end 25 of the plug portion 24 further comprises a seal seat 32 configured to receive a gasket 37 and for sealing engagement with the receiver 90 when the fueling adapter 10 is attached to the fuel receiver 90. The preferred gasket 37 comprises rubber, however any suitable material can be used for the gasket, and a skilled artisan will be able to select an appropriate material for the gasket in a particular embodiment having a gasket based on various considerations, including the intended use of the fueling adapter, the intended arena within which the fueling adapter will be used, and the equipment and/or accessories with which the fueling adapter is intended to be used, among other considerations.

The plug portion 24 comprises an extension 33 which extends away from the first end 25. The extension 33 comprises an outer surface 34 into which the outer race groove 26 is defined.

Figure 9:
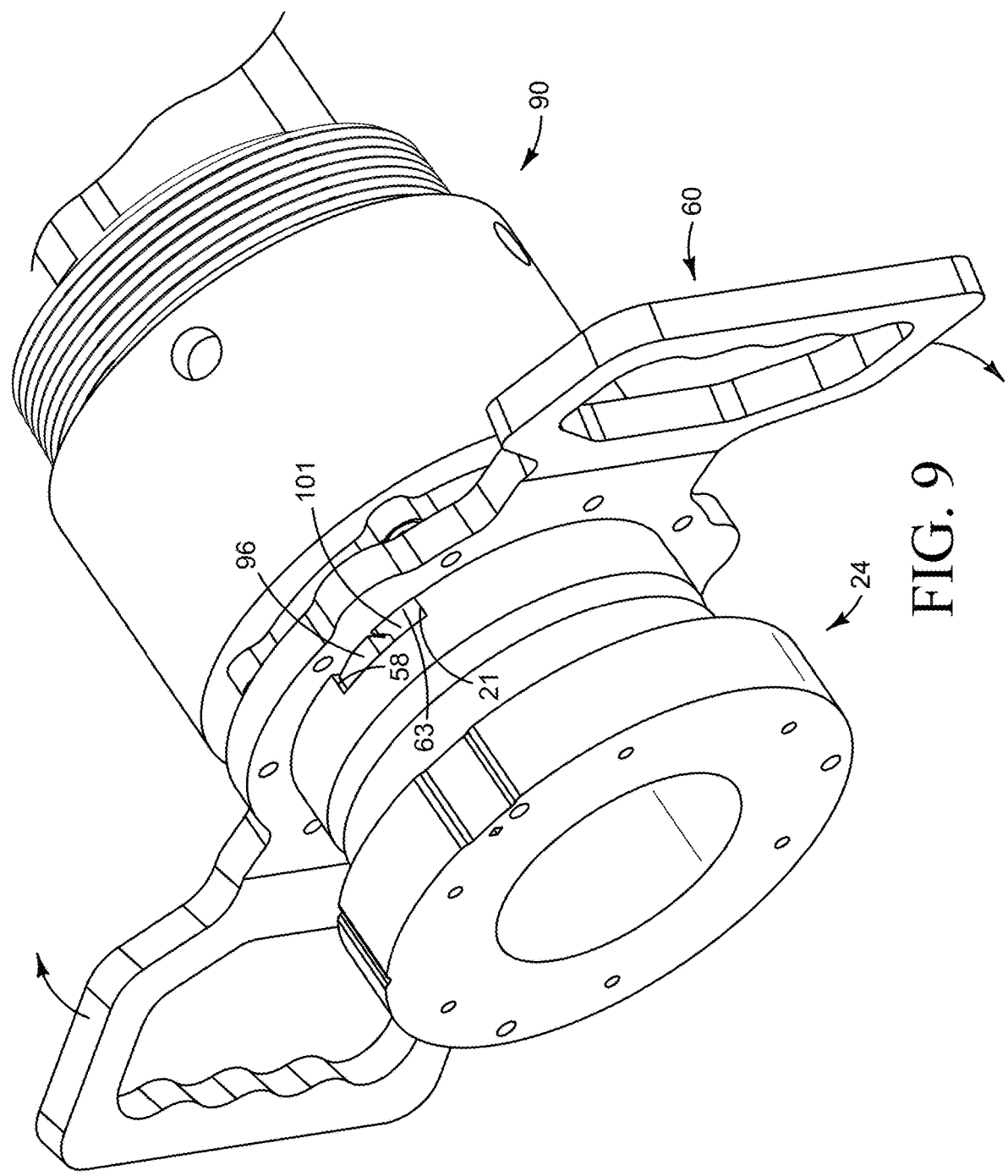
FIG. 9 is a perspective detail view of the exemplary fueling adapter of FIG. 1 illustrating the fueling adapter locked into the receiver, the twist lock coupling portion not illustrated.

The extension 33 defines three radially spaced notches 101 which each have a first end 58 and a second end 21. FIG. 9 illustrates a partial perspective detail view of the exemplary fueling adapter 10, with the fueling adapter 10 locked onto the receiver 90. In FIG. 9, for illustrative purposes, the twist lock coupling portion 22 is not illustrated, and the shell 70 is not illustrated. The plug portion 24 and the handle assembly 60 together forming a plurality of grooves configured for receiving the tabs 96 therein, each groove defined by the notches 101, the slots 63, and the handle assembly 60 adjacent the notch 101. In this view, the tab 96 has been slid through the slot 63 and into the groove defined by the notch 101, the slot 63, and the handle assembly 60 adjacent the notch 101. The handle assembly 60 is then rotated so that the first end 58 is brought into contact with the tab 96, thereby locking the fueling adapter 10 onto the receiver 90 by locking the tab 96 within the groove. To unlock the fueling adapter 10 from the receiver 90, the handle assembly 60 would be rotated the opposite direction so that the second end 21 of the notch 101 is brought into contact with the tab 96, and the tab 96 can be slid out off the groove, back through the slot 63, and the fueling adapter 10 can be lifted off the receiver 90.

The second end 28 comprises an end plate 40. The inlet 30 is defined through the end plate 40. The end plate 40 has an end surface 41 configured for attachment to a mating face 48 of the second end 44 of the twist lock coupling 22.

The end plate 40 further comprises a plurality of equiradially disposed threaded passageways 56 therethrough. In the exemplary fueling adapter 10 illustrated in FIGS. 1-17, the number of threaded passageways 56 is three. As discussed above, a plurality of equiradially disposed limiter channels 69 are defined in the end face 88. In the exemplary fueling adapter 10 illustrated in these Figures, the limiter channels 69 number three. The limiter channels 69 extend into the end face 88. The limiter channels 69 are configured to receive a plurality of limiter pins 38. The limiter channels 69 and limiter pins 38 are configured to limit the rotation of the twist lock assembly 20 in relation to the dry break assembly 57.

The limiter pins 28 preferably comprise ball plungers. A plug insert (not illustrated) can be inserted into the threaded hole 55 after the limiter pin 38 is run partially through the threaded hole 55 so that at least the ball of the limiter pin 38 is within the limiter channel 69. The plug insert for preventing the limiter pin 38 from backing out of the threaded hole 55.

The threaded passageways 56 extend through the end plate 40, from the end surface 41 to an inside surface 51. When assembled, the inside surface 51 faces the end face 88, and the pins 38 (which were inserted into the threaded passageways 56 so that they protrude from the inside surface 51) extend into the limiter channels 69. In such a configuration, the twist lock assembly 20 and the dry break assembly 50 are limited to be rotated sixty (60) degrees with respect to one another before being stopped. FIG. 14 illustrates a perspective detail view of the exemplary fueling adapter 10 which illustrates the swivel limits, the twist lock coupling 22 and the plug portion 24 are not illustrated in FIG. 14 for illustrative purposes. In FIG. 14, the limiter pins 38 are able to freely move along grooves 69, and are not attached to the grooves 69 or to the shell 70.

While such a degree of rotation is disclosed by the embodiment illustrated in FIGS. 1-17, a skilled artisan will be able to select an degree of rotation for the components in a particular embodiment based on various considerations, including the intended use of the fueling adapter, the intended arena within which the fueling adapter will be used, and the equipment and/or accessories with which the fueling adapter is intended to be used, among other considerations.

In the exemplary fueling adapter 10 illustrated in these Figures, when assembled, the mounting flange 47 covers the opening into the threaded passageways 56 in the end surface 41 of the plug portion 24. The twist lock coupling 22 comprises a mounting flange 47 at a second end 44, and a barrel portion 83 at a first end 42.

The first end 42 defines an inlet 43, and the second end 44 defines an outlet 45. The outlet 45 and inlet 43 define a passageway 46 through the twist lock coupling 22. The passageway 46 extends through the twist lock coupling 22 to the second end 44 at the outlet 45, so that when connected to a fuel dispenser 80, fuel can flow through the inlet 43 and into the passageway 46, out the outlet 45, into the inlet 30 of the plug portion 24, through the passageway 35 of the plug portion 24, out the outlet 29 of the plug portion 24 and into the fuel receiver 90.

The barrel portion 83 has an outer surface 91 which comprises a pair of radially spaced tabs 52 which project outwardly from or adjacent to the first end 42 of the twist lock coupling 22. The tabs 52 are dimensioned and positioned to slidably lock onto flanges 82 defined on the fuel dispenser 80. Slots 54 are defined between the tabs 52. The tabs 52 are generally wedge-shaped in side elevation, and are configured for mating engagement with the pair of flanges 82 on the twist lock mating assembly 81 of the fuel dispenser 80.

The twist lock mating assembly 81 can be attached to the twist lock coupling 22 of the fueling adapter 10 by inserting the nozzle 85 of the fuel dispenser 80 into the passageway 46, slidably passing the flanges 82 through the slots 54, and bringing the rim 89 of the twist lock coupling 22 into contact with an internal face 102 of the twist lock mating assembly 81. The internal face 102 preferably comprises a gasket (not illustrated), and the rim 89 preferably has a finish capable of sealing against the gasket installed on the internal face 102. Rotation of the handle system 84 of the twist lock mating assembly 81 results in the flanges 82 engaging the wedge-shaped tabs 52, drawing the rim 89 tight against the internal face 102, resulting in an interference fit and thereby locking the twist lock mating assembly 81 onto the fueling adapter 10. In such a configuration, the rim 89 can bear upon the internal face 102, thereby limiting the rotation of the fueling adapter 10 onto the fuel receiver 90.

The mounting flange 47 is configured to be mounted to the end plate 40 of the plug portion 24 so that the passageway 46 of the twist lock coupling 22 is aligned with the passageway 35 of the plug portion 24. An outlet 45 is defined through the mounting flange 47. The mounting flange 47 has a mating face 48 which is configured for contacting to the end surface 41 of the second end 28 of the plug portion 24.

In use, the fueling adapter 10 could be first installed on the receiver 90, and then the fuel dispenser 80 attached to the fueling adapter 10. Alternatively, the fueling adapter 10 could be first installed on the fuel dispenser 80, and then the receiver 90 attached to the fueling adapter 10. While the Figures illustrate the attachment of the fueling adapter 10 first onto the receiver 90, such illustration is not intended to be limiting.

Figure 6:
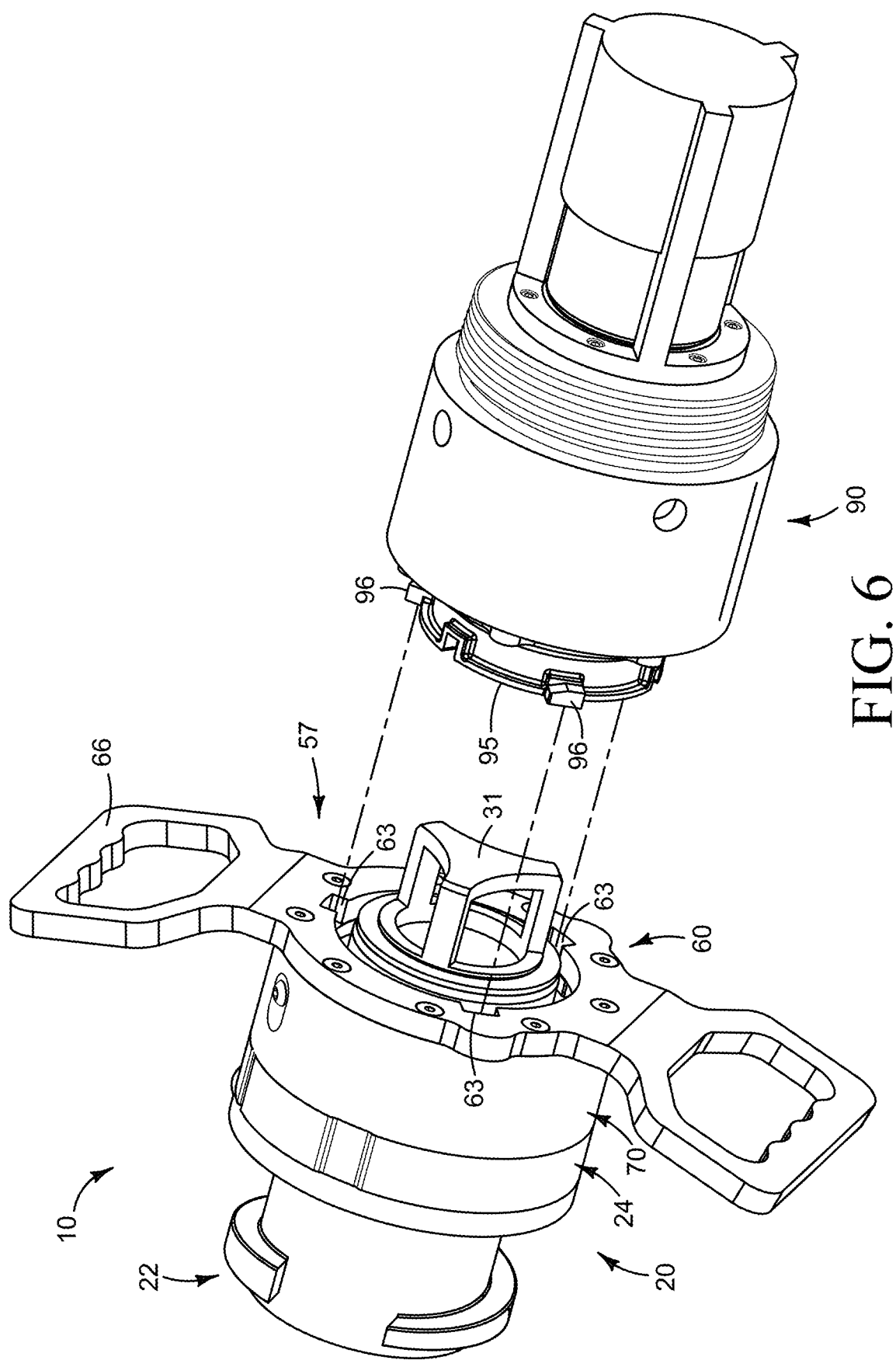
FIG. 6 is a perspective view of the second end of the exemplary fueling adapter of FIG. 1, illustrating the fueling adapter aligned for insertion into a receiver.
Figure 15:
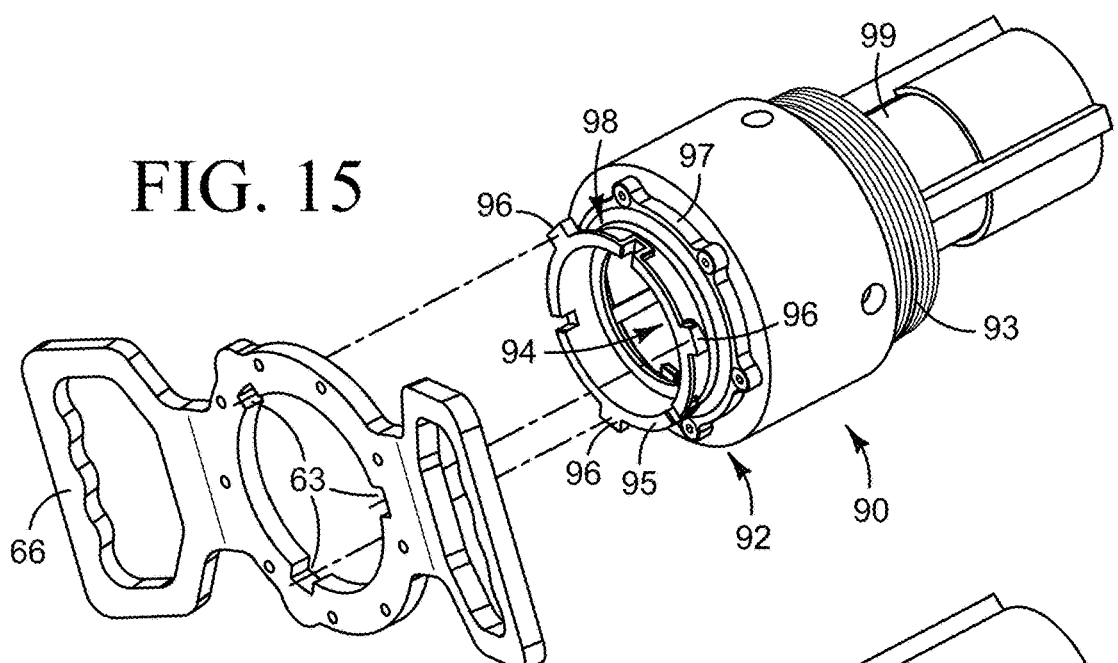
FIG. 15 is a perspective view of the handle assembly portion of the exemplary fueling adapter of FIG. 1, illustrating the fueling adapter aligned for insertion into a receiver.

FIG. 6 illustrates a perspective view of the second end of the exemplary fueling adapter 10, illustrating the fueling adapter 10 aligned for connection with the receiver 90, namely the slot 63 in the handle assembly 60 are aligned with the tabs 96 of the fuel receiver, and the poppet valve depressor 31 is aligned to be inserted into the opening to the fuel flow passageway 94 (hidden) defined by the rim 95. FIG. 15 illustrates the same thing from a different angle, but only illustrates the handle assembly 60 portion of the fueling adapter 10.

Figure 16:
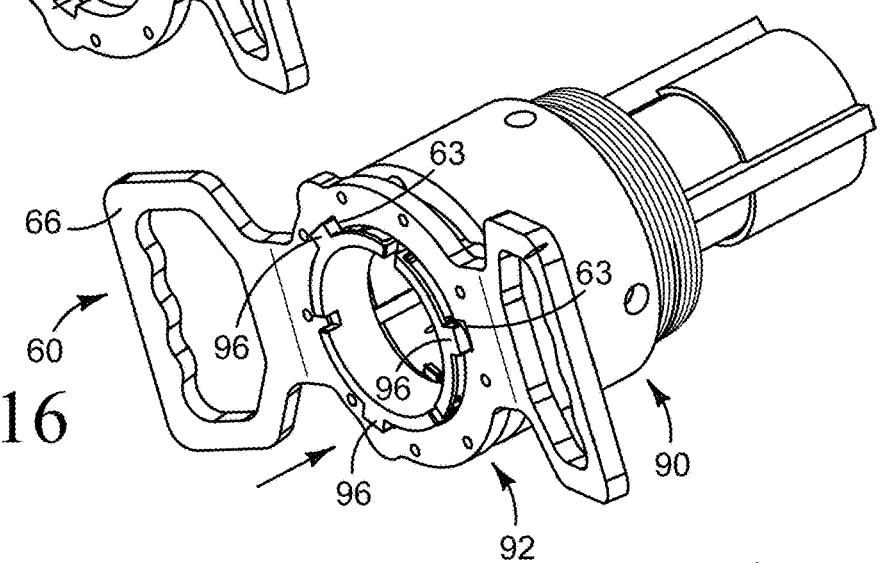
FIG. 16 is a perspective view of the handle assembly portion of the exemplary fueling adapter of FIG. 1, illustrating the fueling adapter inserted into the receiver.

FIG. 7 illustrates a perspective view of the second end of the exemplary fueling adapter 10, illustrating the fueling adapter 10 initially connected with the receiver 90, with the slot 63 in the handle assembly 60 slid onto the tabs 96, and the poppet valve depressor 31 (hidden) inserted into the opening to the fuel flow passageway defined by the rim (hidden). FIG. 16 illustrates the same thing from a different angle, but only illustrates the handle assembly 60 portion of the fueling adapter 10.

Figure 17:
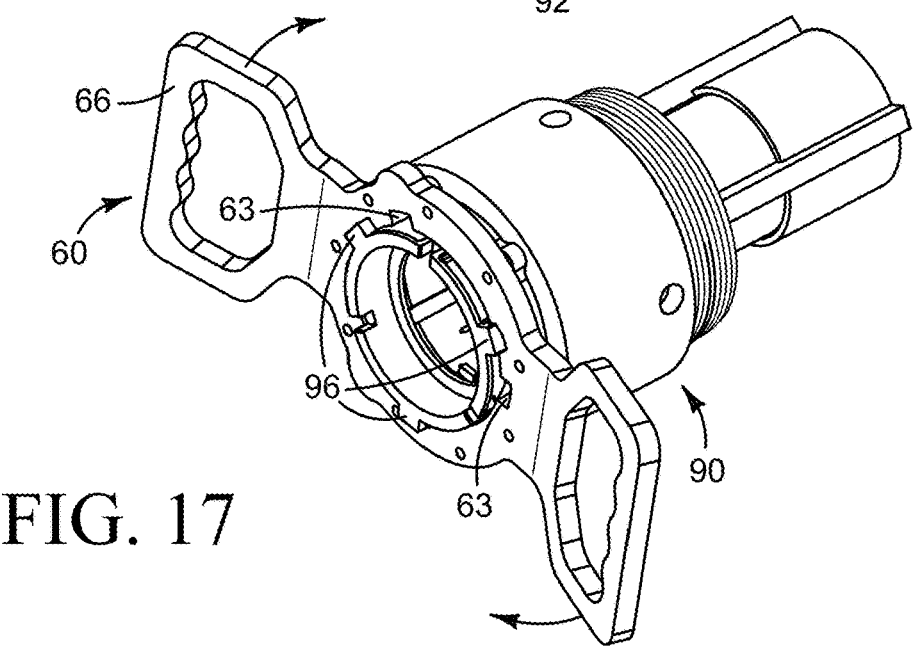
FIG. 17 is a perspective view of the handle assembly portion of the exemplary fueling adapter of FIG. 1, illustrating the fueling adapter inserted into the receiver, and rotated onto the receiver.

FIG. 8 illustrates a perspective view of the second end of the exemplary fueling adapter 10, illustrating the poppet valve depressor (hidden) inserted into the opening to the fuel flow passageway (hidden), the tabs 96 slid through the slot 63, and the handle assembly 60 rotated relative to the receiver 90. In doing so, the handle assembly 60 is cammed onto the receiver 90, as described with respect to FIG. 9 above. FIG. 17 illustrates the same thing from a different angle, but only illustrates the handle assembly 60 portion of the fueling adapter 10.

Figure 10:
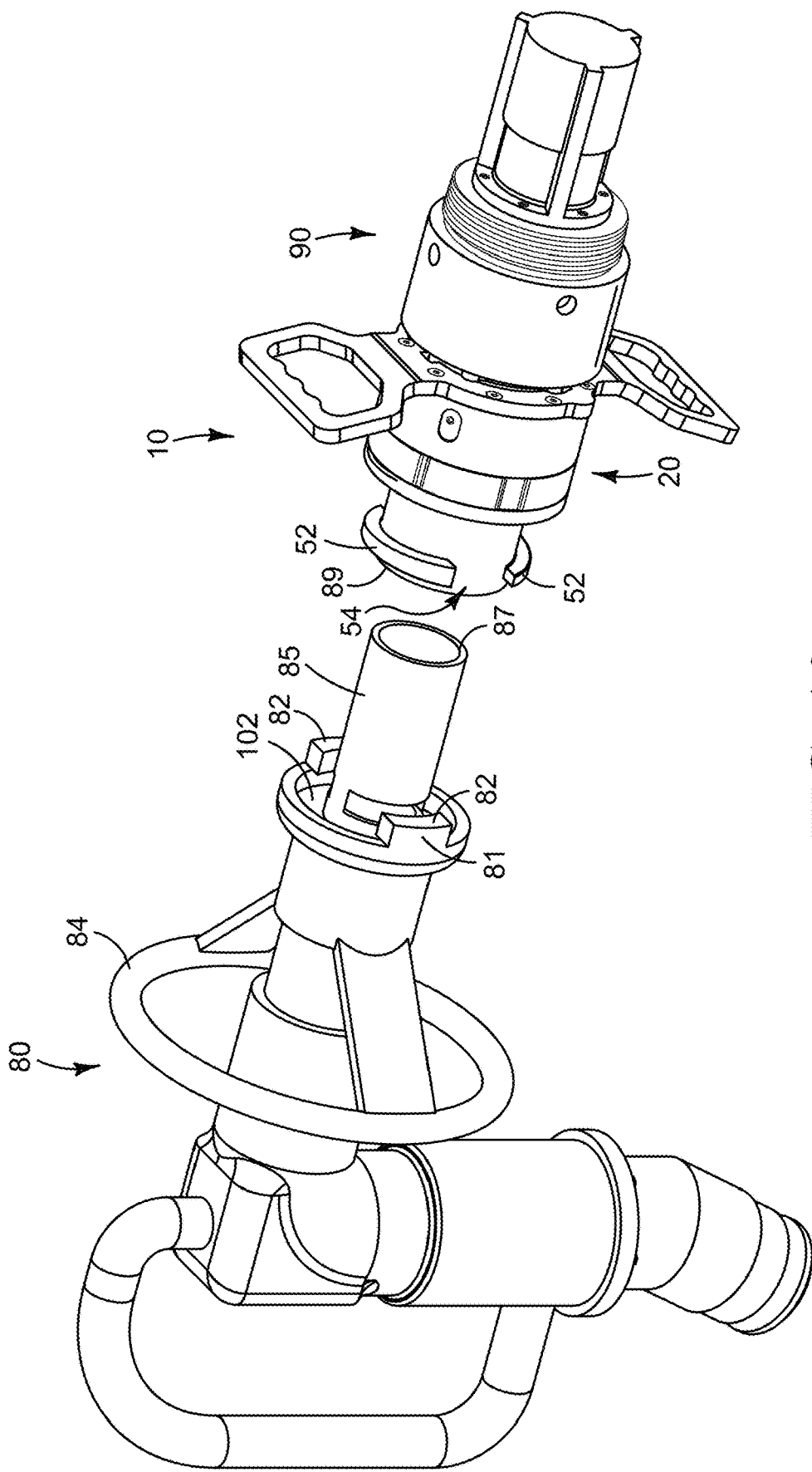
FIG. 10 is a second end perspective view of the exemplary fueling adapter of FIG. 1, including environment, illustrating the fueling adapter locked onto the receiver and aligned for receipt of a twist lock coupling fueling nozzle.

Turning next to FIG. 10, FIG. 10 illustrates a second end perspective view of the exemplary fueling adapter 10, and includes the fuel dispenser 80 and fuel receiver 90. In FIG. 10, the fueling adapter 10 has already been locked onto the receiver 90. In FIG. 10, the fueling adapter 10 is aligned for connection with the twist lock mating assembly 81 of the fuel dispenser 80. FIG. 10 also illustrates the flanges 82 of the fuel dispenser 80 aligned with the slots 54 of the fueling adapter 10.

Figure 11:
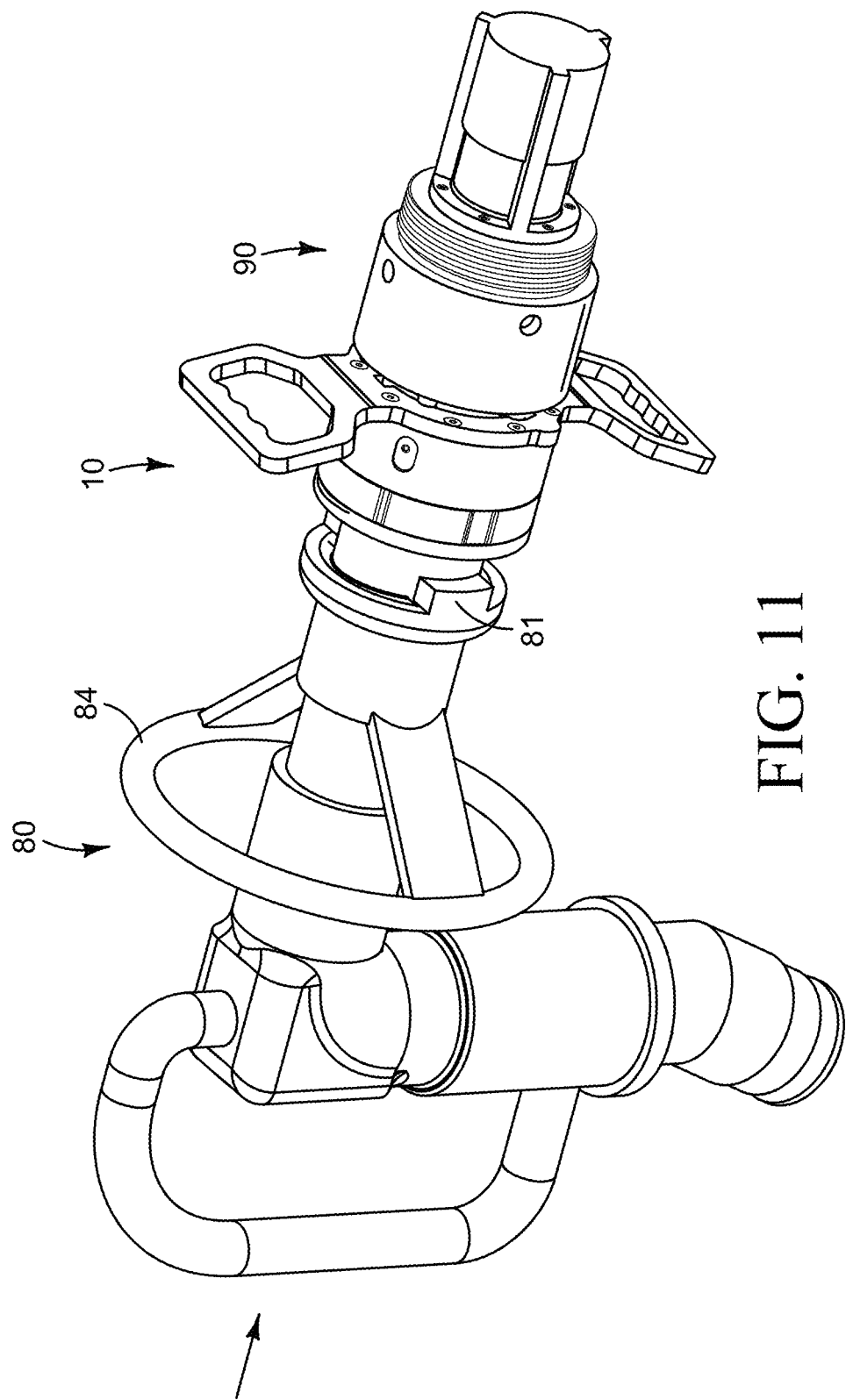
FIG. 11 is a second end perspective view of the exemplary fueling adapter of FIG. 1, including environment, illustrating the fueling adapter slid onto the receiver, with the twist lock coupling fueling nozzle inserted into the fueling adapter.

FIG. 11 illustrates a second end perspective view of the exemplary fueling adapter 10, and includes the fuel dispenser 80 and fuel receiver 90. FIG. 11 illustrates the fueling adapter 10 slid onto the receiver 90, with the flanges 82 slid through the slots 54 of the fueling adapter 10.

Figure 12:
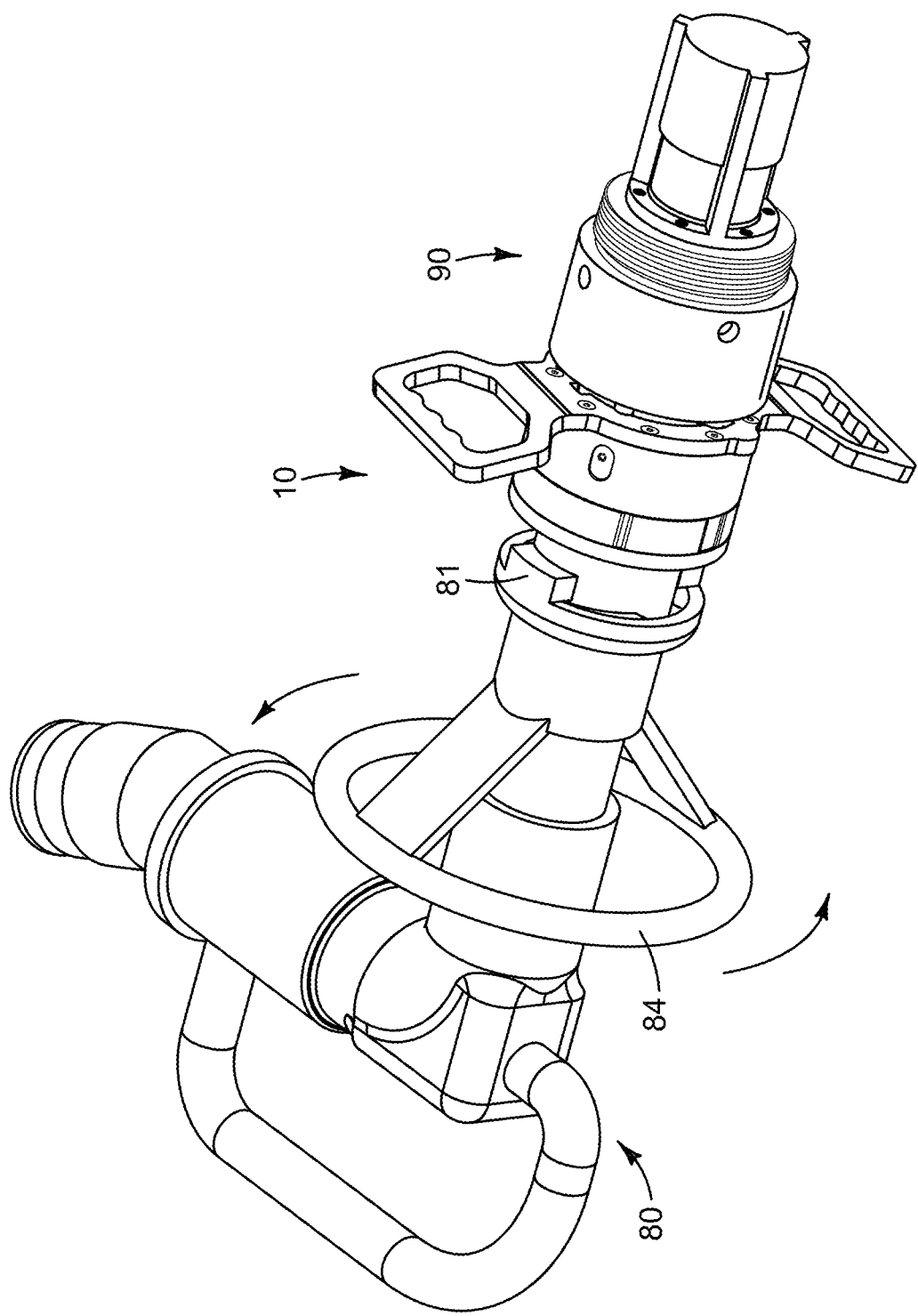
FIG. 12 is a second end perspective view of the exemplary fueling adapter of FIG. 1, including environment, illustrating the fueling adapter locked onto the receiver, with the twist lock coupling fueling nozzle inserted into the fueling adapter, and with the fueling nozzle rotated onto the fueling adapter.

FIG. 12 illustrates a second end perspective view of the exemplary fueling adapter 10, and includes the fuel dispenser 80 and fuel receiver 90. FIG. 12 further illustrates the fueling adapter 10 slid onto the receiver 90, with the flanges 82 slid through the slots 54 of the fueling adapter 10, and the twist lock mating assembly 81 of the fuel dispenser 80 rotated relative to the fueling adapter 10 so that the fuel dispenser 80 is cammed onto the fueling adapter 10. FIG. 13 illustrates a rotated second end perspective view of the exemplary fueling adapter 10, and includes the fuel dispenser 80 and fuel receiver 90, as illustrated in FIG. 12.

In other exemplary fueling adapters, alternative connection standards besides a twist lock coupling style fuel dispenser could be specified, such as a range of API style couplers, cam locks and a range of other dry break connections for the top of the fueling adapter. A skilled artisan will be able to select an appropriate connection standard in a particular embodiment based on various considerations, including the intended use of the fueling adapter, the intended arena within which the fueling adapter will be used, and the equipment and/or accessories with which the fueling adapter is intended to be used, among other considerations.

It is noted that all structure and features of the various described and illustrated embodiments can be combined in any suitable configuration for inclusion in a fueling adapter according to a particular embodiment.

Any suitable materials can be used to form the various components of the fueling adapter, and a skilled artisan will be able to select appropriate materials for a fueling adapter according to a particular embodiment based on various considerations, including the industry within which the fueling adapter is intended to be used, the environment within which the fueling adapter is intended to be used, and the equipment with which the fueling adapter is intended to be used.

Except as otherwise noted herein, the inventor has determined that conventional polymeric and metal materials are suitable for use in the various components of the fueling adapter. Materials hereinafter discovered and/or developed that are determined to be suitable for use in fueling devices would also be considered suitable for use in a fueling adapter according to a particular embodiment.

Still other features and advantages of the disclosed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred and example embodiments are to be regarded as illustrative in nature, and not as restrictive in nature.

While there is shown and described the present preferred embodiment(s) of the inventive concept(s), it is to be distinctly understood that this inventive concept(s) is not limited thereto but may be variously embodied to practice within the scope of this disclosure. From the foregoing description, it will be apparent that various changes may be made without departing from the spirit and scope of the inventive concept(s) as defined herein.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

The invention claimed is:

1. A fueling adapter configured to permit a fuel dispenser which terminates in a twist lock mating assembly to be used to supply fuel to a fuel tank which has a fuel receiver outfitted with a dry break connector connected thereto, said fueling adapter comprising:
    a dry break assembly rotatably connected to a twist lock assembly via a rotational connector;
    said dry break assembly comprising a first passageway defined therethrough, said twist lock assembly defining a second passageway therethrough, said first passageway fluidly connected to the second passageway so as to define a fuel passageway through the fueling adapter;
    said dry break assembly configured for connecting with said dry break connector, said dry break assembly further comprising a handle assembly configured for allowing a user to twist the dry break assembly on and off said fuel receiver, wherein the handle assembly defines a generally circular orifice therethrough which has an annular sidewall connected to a periphery thereof, wherein the sidewall defines a plurality of radially spaced slots therethrough;
    said twist lock assembly configured for connecting with said twist lock mating assembly, said twist lock assembly comprising a twist lock coupling and a plug portion; and
    said rotational connector configured for permitting rotation of the dry break assembly relative to the twist lock assembly.

2. The fueling adapter of claim 1, wherein said dry break assembly further comprises a body portion connecting to said handle assembly.

3. The fueling adapter of claim 2, wherein said plug portion further comprises an extension which extends away from a first end of said plug portion, wherein said extension of the plug portion defines a plurality of radially spaced notches each having notch first end and a notch second end, said slots and notches configured for alignment to create grooves, and wherein said grooves are dimensioned and positioned to slidably receive therein a plurality of radially spaced tabs extending from said dry break connector.

4. The fueling adapter of claim 1, further comprising a rotation limiter for limiting rotation of the dry break assembly in relation to the twist lock assembly via said rotational connector.

5. The fueling adapter of claim 4:
    wherein said dry break assembly further comprises a body portion connecting to said handle assembly; and
    wherein the rotation limiter comprises:
        a plurality of equiradially disposed limiter channels defined in an end face a second end of the body portion;
        a plurality of equiradially disposed threaded passageways through an end plate in a second end of the plug portion; and
        a plurality of threaded limiter pins extending from said threaded passageways and into said limiter channels, wherein the limiter pins are able to freely move along said limiter channels and are not attached to said body portion, and wherein the limiter channels define a length which defines the limits to the rotation of the dry break assembly in relation to the twist lock assembly via the rotational connector.

6. The fueling adapter of claim 5, wherein the number of said limiter channels and said threaded passageways is three.

7. The fueling adapter of claim 5, wherein the limiter pins comprise ball plungers.

8. The fueling adapter of claim 1:
    wherein said dry break assembly further comprises a body portion connecting to said handle assembly; and
    wherein said plug portion further comprises an extension which extends away from a first end of said plug portion, wherein said extension of the plug portion defines radially spaced notches each having notch first end and a notch second end, said slots and notches configured for alignment to create grooves, and wherein said grooves are dimensioned and positioned to slidably receive therein a plurality of radially spaced tabs extending from said dry break connector.

9. The fueling adapter of claim 8, further comprising a rotation limiter for limiting rotation of the dry break assembly in relation to the twist lock assembly via said rotational connector.

10. The fueling adapter of claim 1, wherein a first end of the plug portion further defines a poppet valve depressor configured to depress a dry break connection poppet valve in the fuel receiver when the fueling adapter is attached to the fuel receiver.

11. The fueling adapter of claim 1:
    wherein a first end of the plug portion further defines a poppet valve depressor configured to depress a dry break connection poppet valve in the fuel receiver when the fueling adapter is attached to the fuel receiver,
    further comprising a rotation limiter for limiting rotation of the dry break assembly in relation to the twist lock assembly via said rotational connector.

12. The fueling adapter of claim 1,
    wherein said dry break assembly further comprises a body portion and a handle assembly connecting to said body portion, said handle assembly for allowing a user to twist the dry break assembly on and off said fuel receiver;
    wherein a first end of the plug portion further defines a poppet valve depressor configured to depress a dry break connection poppet valve in the fuel receiver when the fueling adapter is attached to the fuel receiver; and
    further comprising a rotation limiter for limiting rotation of the dry break assembly in relation to the twist lock assembly via said rotational connector.

13. The fueling adapter of claim 1, wherein a first end of the plug portion further comprises a seal seat configured to receive a gasket for sealing engagement with the fuel receiver when the fueling adapter is attached to the fuel receiver.

14. The fueling adapter of claim 1, wherein the twist lock coupling comprises a barrel portion, the barrel portion having an outer surface which comprises a pair of radially spaced tabs which project outwardly from or adjacent to a first end of the twist lock coupling, wherein the radially spaced tabs are dimensioned and positioned to slidably lock onto flanges defined on the fuel dispenser, wherein slots are defined between the radially spaced tabs, wherein the radially spaced tabs are generally wedge-shaped in side elevation and are configured for mating engagement with a pair of flanges on the twist lock mating assembly of the fuel dispenser.

15. The fueling adapter of claim 14, wherein the twist lock mating assembly can be attached to the twist lock coupling of the fueling adapter by inserting a nozzle of the fuel dispenser into an inlet of the twist lock assembly, slidably passing the flanges through the slots, and bringing a rim of the twist lock coupling into contact with an internal face of the twist lock mating assembly, and rotation of a handle system of the twist lock mating assembly to cause the flanges to engage the radially spaced tabs, thereby drawing the rim tight against the internal face and locking the twist lock mating assembly onto the fueling adapter.

16. The fueling adapter of claim 1, further comprising a rotation limiter for limiting rotation of the dry break assembly in relation to the twist lock assembly via said rotational connector,
wherein said dry break assembly further comprises a body portion connecting to said handle assembly, wherein said plug portion further comprises an extension which extends away from a first end of said plug portion, wherein said extension of the plug portion defines a plurality of radially spaced notches each having notch first end and a notch second end, said slots and notches configured for alignment to create grooves, and wherein said grooves are dimensioned and positioned to slidably receive therein a plurality of radially spaced tabs extending from said dry break connector, and
wherein the rotation limiter comprises:
a plurality of equiradially disposed limiter channels defined in an end face of a second end of the body portion;
a plurality of equiradially disposed threaded passageways through an end plate in the second end of the plug portion; and
a plurality of threaded limiter pins extending from said threaded passageways and into said limiter channels, wherein the limiter pins are able to freely move along said limiter channels and are not attached to said body portion,
wherein the limiter channels have a length defining the limits to the rotation of the dry break assembly in relation to the twist lock assembly via the rotational connector.

17. The fueling adapter of claim 1, wherein the twist lock coupling comprises a barrel portion, the barrel portion having an outer surface which comprises a pair of radially spaced tabs which project outwardly from or adjacent to a first end of the twist lock coupling, wherein the tabs are dimensioned and positioned to slidably lock onto flanges defined on the fuel dispenser, wherein slots are defined between the tabs, wherein tabs are generally wedge-shaped in side elevation and are configured for mating engagement with the flanges; and
wherein said dry break assembly further comprises a body portion connecting to said handle assembly, wherein said plug portion further comprises an extension which extends away from a first end of said plug portion, wherein said extension of the plug portion defines a plurality of radially spaced notches each having notch first end and a notch second end, said slots and notches configured for alignment to create grooves, and wherein said grooves are dimensioned and positioned to slidably receive therein a plurality of radially spaced tabs extending from said dry break connector.

18. A fueling adapter configured to permit a fuel dispenser which terminates in a twist lock mating assembly to be used to supply fuel to a fuel tank which has a fuel receiver outfitted with a dry break connector connected thereto, said fueling adapter comprising:
a dry break assembly rotatably connected to a twist lock assembly via a rotational connector;
said dry break assembly comprising a first passageway defined therethrough, said twist lock assembly defining a second passageway therethrough, said first passageway fluidly connected to the second passageway so as to define a fuel passageway through the fueling adapter;
said dry break assembly comprising a tubular body portion, said tubular body portion further comprising a body first end, a body second end, an outside surface, and an inside surface;
said twist lock assembly comprising a twist lock coupling and a plug portion, the plug portion comprising a plug portion first end which defines an outlet, and a plug portion second end which defines an inlet, the outlet and inlet define said second passageway therebetween, the plug portion further comprising an extension which extends away from said plug portion first end;
said rotational connector configured for permitting rotation of the dry break assembly relative to the twist lock assembly; and
a rotation limiter for limiting the rotation of the dry break assembly in relation to the twist lock assembly via said rotational connector, wherein the rotation limiter comprises a plurality of equiradially disposed limiter channels defined in an end face of the body second end, a plurality of equiradially disposed threaded passageways through an end plate in the second end of the plug portion, and a plurality of threaded limiter pins extending from said threaded passageways and into said limiter channels, said limiter pins are able to freely move along said limiter channels and are not attached to said body portion, wherein the limiter channels have a length defining the limits to the rotation of the dry break assembly in relation to the twist lock assembly via the rotational connector.

19. The fueling adapter of claim 18, wherein said dry break assembly further comprises a handle assembly connecting to said body portion, said handle assembly for allowing a user to twist the dry break assembly on and off said fuel receiver, wherein the handle assembly defines a generally circular orifice therethrough which has an annular sidewall connected to a periphery thereof, wherein the sidewall defines three radially spaced slots therethrough, wherein said extension of the plug portion defines three radially spaced notches each having notch first end and a notch second end, said slots and notches configured for alignment to create grooves, and wherein said grooves are dimensioned and positioned to slidably receive therein three radially spaced tabs extending from said dry break connector.

20. The fueling adapter of claim 18, wherein the twist lock coupling comprises a barrel portion, the barrel portion having an outer surface which comprises a pair of radially spaced tabs which project outwardly from or adjacent to the first end of the twist lock coupling, wherein the tabs are dimensioned and positioned to slidably lock onto flanges defined on the fuel dispenser, wherein slots are defined between the tabs, wherein tabs are generally wedge-shaped in side elevation and are configured for mating engagement with the flanges.

\* \* \* \* \*